P. G. H. Shaeffer.
Tea Pot.

Nº 55,720. Patented Jun. 19, 1866.

Witnesses.
Gustav Rilstok
J. B. Lax

Inventor.
P. G. H. Schaeffer.

UNITED STATES PATENT OFFICE.

P. G. H. SCHAEFFER, OF WEST MERIDEN, CONNECTICUT.

IMPROVEMENT IN TEA AND COFFEE POTS.

Specification forming part of Letters Patent No. 55,720, dated June 19, 1866.

*To all whom it may concern:*

Be it known that I, P. G. H. SCHAEFFER, of West Meriden, county of New Haven, and State of Connecticut, have invented or discovered a new and useful improvement in the mode or process of manufacturing tea and coffee pots and the like vessels; and I do hereby declare that the same is described and represented in the following specification and drawing, so as to enable others skilled in the art to make and use the same therefrom.

Letters of reference marked thereon indicate like parts in each of the figures.

The nature of this improvement will be fully understood from the specification and drawing.

The object desired to be attained thereby is to produce a tea or coffee pot, or vessel of like nature, comely in its appearance, cheap of manufacture, and more durable for use, and at the same time, while it is manufactured of cheap material, embellished without any expense of hand-chased work, &c. It will bear a very favorable comparison by the side of those of more elaborate work and costly material.

It consists in making the vessel of what is commonly called "tin-plate," and impressing the desired figure upon the surface of the plate before it is bent into shape.

It also consists in forming the base and bottom, with the embossed work thereon, in one piece of sheet-tin.

It also consists (after having properly secured the edges of the plate together which forms the body proper) in spinning or turning the upper end of the body so as to form a rim or flange, the object of which is to stiffen the top edge of the body and at the same time to form a broad flat surface or base upon which to mount and secure the rim, to which the lid is jointed in the usual way.

Figure 1:
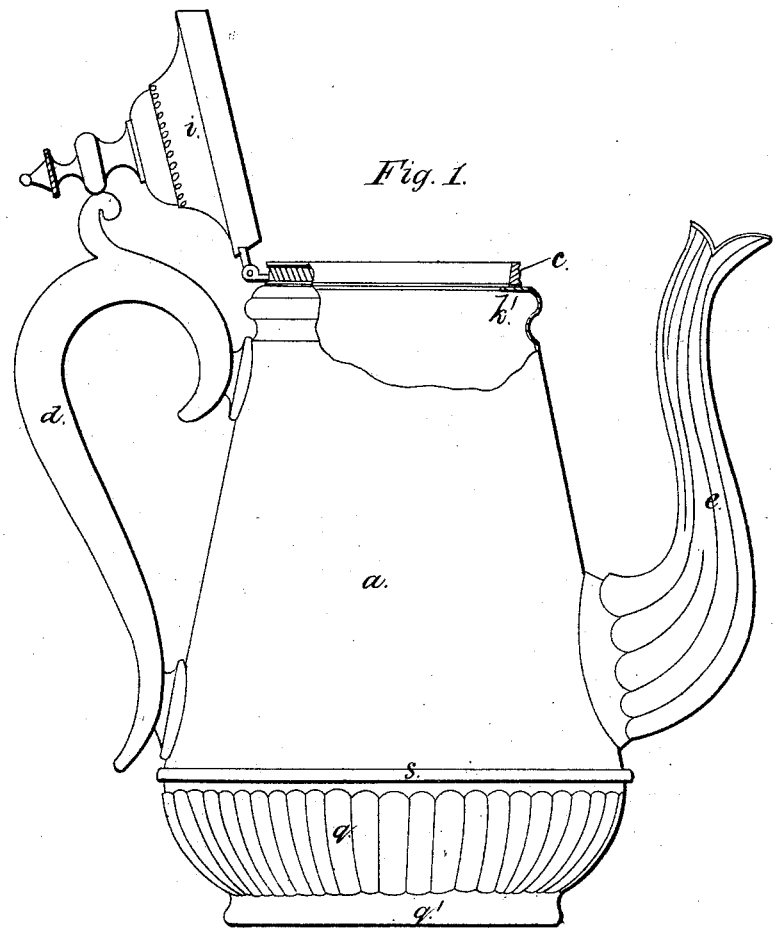
Figure 2:
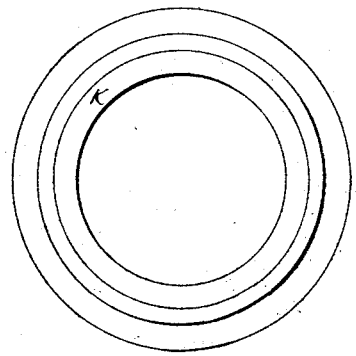

In the accompanying drawing, Figure 1 is a side elevation, broken away at the top of the body, so as to clearly show the rim or flange upon which the lid-rim is secured.

$a$ is the body proper. $c$ is the rim to which the lid is secured or jointed. $d$ is the handle. $e$ is the nozzle. $i$ is the lid. $c$ is the rim which is secured to the broad flat surface or flange $k$, which is spun or turned inward on the upper edge of the body $a$, so as to form a broad surface upon which to firmly secure the rim $c$ and at the same time to greatly strengthen the upper end of the body $a$.

$q\ q'$ is the base and bottom of the vessel, made in one piece of (sheet metal) tin formed and embossed in a die, so as to produce uniformity of shape and rapidity of execution in the manufacture.

The body $a$ and base $q$ are united at $s$, thus forming a vessel for liquids having a rich symmetrical appearance, cheap and simple of construction, substantial and durable for use, and may be made by less skillful workmen.

I believe I have thus shown the nature, construction, and advantage of this improvement, so as to enable others skilled to make the same therefrom.

What I claim, therefore, and desire to secure by Letters Patent, is—

The combination of the flange $k$ with the embossed body, substantially as described.

P. G. H. SCHAEFFER. [L. S.]

Witnesses:
GUSTAV REBSTOK,
T. B. SAX.